United States Patent [19]
Todd

[11] 3,794,767
[45] Feb. 26, 1974

[54] CONTROL CIRCUIT FOR TELEPHONE ANSWERING SET WITH A RECORDER USING A CONVENTIONAL RECORD-PLAY SWITCH

[76] Inventor: Leonard M. Todd, 424 W. 119th St., New York, N.Y. 10027

[22] Filed: May 3, 1972

[21] Appl. No.: 250,068

Related U.S. Application Data

[63] Continuation-in-part of Ser. No. 88,909, Nov. 12, 1970.

[52] U.S. Cl. .............................. 179/6 R, 179/1 SW
[51] Int. Cl. .............................................. H04m 1/64
[58] Field of Search ........... 179/6 R, 6 AC, 6 C, 6 E, 179/100.22, 1 SW

[56] References Cited

UNITED STATES PATENTS

| | | | |
|---|---|---|---|
| 3,445,600 | 5/1969 | Todd | 179/6 R |
| 3,501,592 | 3/1970 | Waldman | 179/6 R |
| 2,815,401 | 12/1957 | O'dwyer | 179/6 R |
| 3,344,234 | 9/1967 | Salzberg | 179/6 R |
| 3,524,936 | 8/1970 | Hill | 179/6 E |

OTHER PUBLICATIONS

Simple Telephone Answering Machine, Spratt, Wireless World, 7/56 p. 344–346.

*Primary Examiner*—Raymond F. Cardillo, Jr.

[57] ABSTRACT

The record-play switch of a message tape deck (preferably of usual design) is coupled to a two position switch to enable a telephone answering set in automatic answer and message playback conditions. This switch may be a single pole, single throw switch. Fast forward, rewind and play controls are used, as may be the record control. A circuit enables the automatic recording of telephone conversations.

24 Claims, 7 Drawing Figures

CONTROL CIRCUIT FOR TELEPHONE ANSWERING SET WITH A RECORDER USING A CONVENTIONAL RECORD-PLAY SWITCH

This application is a continuation-in-part of pending application Ser. No. 88,909, filed Nov. 12, 1970 for Telephone Answering Devices and is filed, in addition, pursuant to a requirement for restriction in the parent application.

This invention is a further development of the telephone answering device of U.S. Pat. No. 3,445,600, issued to me, simplifying construction, reducing costs and increasing reliability.

It is an object of this invention to reduce costs and to reduce the complexity of switching and wiring usually found in telephone answering sets by employing a record-play switch and control therefor, in a message tape deck, coupled to an added "automatic answer''—"message play" switch with a minimum of added controls and a minimum of circuitry to perform the basic functions of a telephone answering set.

It is an object of this invention that by providing a rectifying element, which may be a control thyristor, a diode or a transistor in series with a message tape deck, across a power source, to permit message playback without energizing the announcement tape reproducing means, again simplifying switching, requiring no additional relays, reducing complexity of wiring and lowering costs.

It is an object of this invention to apply the principles to answering sets directly coupled to the telephone line and the set may be acoustically or inductively coupled to the associated telephone set.

It is an object of this invention to provide a circuit to energize the message tape deck automatically when line seizure occurs when a call is placed or received on an associated telephone set and to deenergize the deck when line seizure is released, thereby relieving the user of the need to remember to turn the set on or off or to employ complex voice actuated circuits.

It is an object of this invention to utilize existing contacts of the record-play switch within message tape recorders of usual design to function as the "automatic answer" "message play " switch and in one arrangement requiring only one pair of contacts. Moreover, the usual controls for rewind, fast forward and play are used, as well as the record control.

It is an object of this invention to use a low cost "Compact Cassette" recorder using either pushbutton, lever or dial control, to improve further the economies of this invention.

It is an object of this invention to apply these principles to other conventional recorders for use as a message tape deck, including endless tape auto stero recorders, conventional ac operated recorders or an endless loop cassette may be used in the message tape deck.

Figure 1:
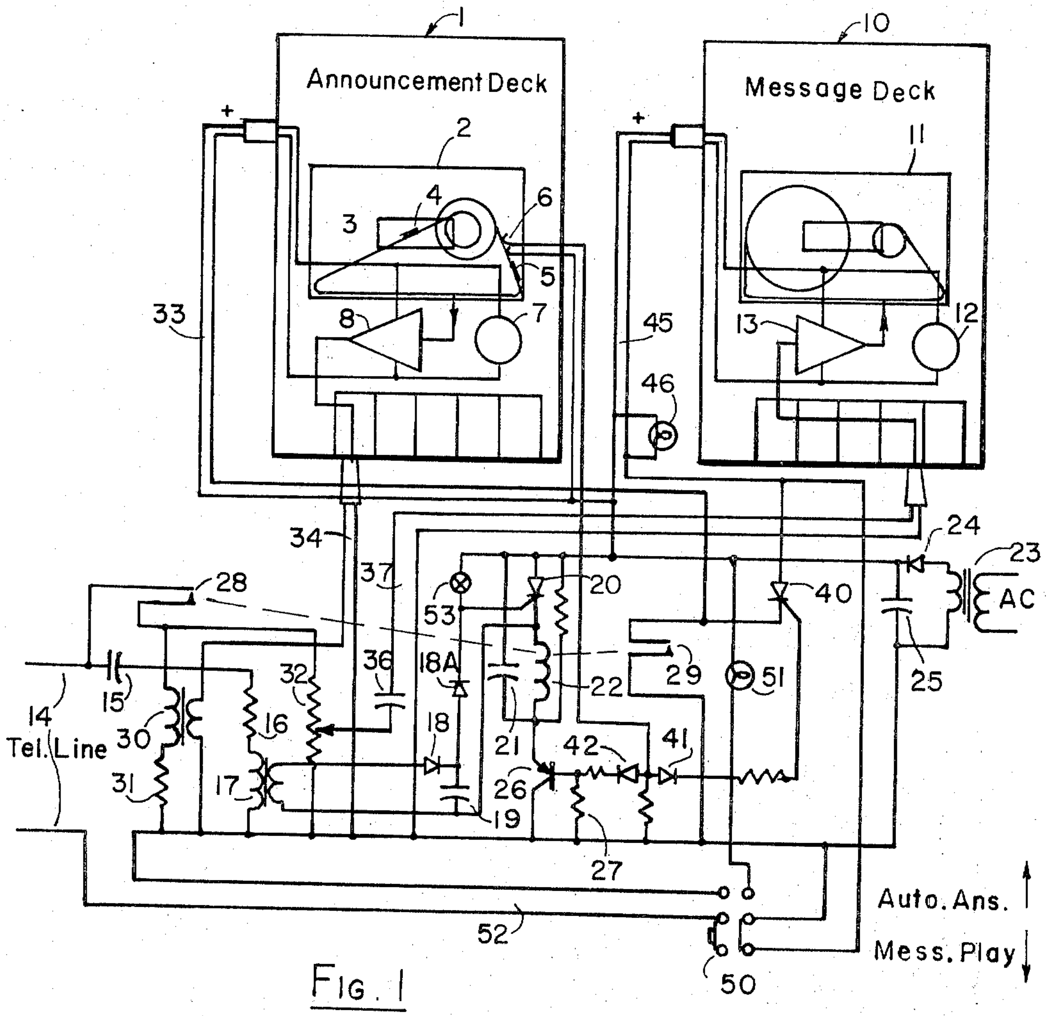
FIG. 1 is an arrangement of two cassette tape recorders with telephone line coupling, SCR-relay-transistor line seizure and timing arrangement and additional switching for automatic answer and message playback.

In FIG. 1, announcement deck 1 contains endless loop cassette 2, endless tape 3, short length of sensing tape 4, long length of sensing tape 5, sensing tape contact 6, motor 7 and amplifier 8. As noted in U.S. Pat. No. 3,445,600, other impulse generating elements may be used on the tape with other impulse sensitive transducers in the deck.

Message record deck 10 contains standard reel-to-reel cassette 11, motor 12 and amplifier 13. In this invention and in the parent application, it is taught that switch 50 (automatic answer-message play) is coupled to the record-play switch of the message play deck. Switch 50 and the record-play switch may be external to the deck with a separate control. There are substantially advantages to employing the record-play switch with the pushbutton control therefor (or lever or dial control as the case may be) within message deck 10 and existing spare contacts of the record-play switch used, saving space and cost, as well as simplifying operation. As will appear further, a circuit is taught employing a single pole, single throw switch to perform this "automatic answer" "message play" function which is more broadly applicable since only two additional contacts can be found in virtually every tape recorder currently marketed and with only minor circuit changes, if any, required.

With switch 50 in "automatic answer" and record-play control of message deck 10 in record, a ring-up signal from telephone line 14 goes through line 52 through capacitor 15, resistor 16 and primary of transformer 17 to secondary of 17, diodes 18 and 18A and capacitor 19 to gate of SCR 20 causing the SCR to latch on. Network 15, 16 and 17 together with the low gate triggering power of SCR 20, presents a high impedance to telephone line 14. Current then flows through relay coil 22 and transistor 26, held normally on by resistor 27. Relay contacts 28 close and establish line seizure through transformer 30 and resistor 31. Contacts 29 close.

Announcement deck 1, with switches set for play, starts with current flowing from power supply through contacts 29 (which are closed) over leads 33 to motor 7 and amplifier 8; amplifier output goes through leads 34 and transformer 30 to telephone line 14, carrying the announcement to the caller.

At the conclusion of the announcement, short length of sensing tape 4 closes sensing tape switch 6 sending a short impulse to diode 41 and to the gate of SCR 40 which latches on, causing message deck 10 to start, with its switch in record. Current flows from power supply through leads 45 to motor 12, amplifier 13, SCR 40 and closed contacts 29. Lamp 46 lights.

The caller may now leave his message which passes from line 14 through 32, capacitor 36, leads 37 to input of message record amplifier 13 and then is recorded on tape in cassette 11.

At the conclusion of the message, determined by the length of tape 3 between sensing tapes 4 and 5, sensing tape 5 crosses sensing tape switch 6 sending a long impulse through diode 42 to the base of transistor 26 causing it to cease conduction for the duration of the long impulse. Current hen flows from capacitor 21 through SCR 20 and relay coil 22 and resistor in parallel. In the time required for the capacitor to discharge, determined by its value, say 0.3 seconds, relay 22 opens releasing contacts 28, releasing line seizure, releasing contacts 29 stopping both recorders and current also falls below the holding level of SCR 20 which then unlatches. The set has now returned to standby automatic answer condition.

It is noted here that conventional cassette recorders and other types including lever and rotary dial control units and reel to reel open type) provide that depressing both the record and play buttons usually actuates an internal on-off switch "on" (shown in FIGS. 2–7) and places the record-play switch in record position. Pushbuttons latch in the actuated position by a detent; pushing one button releases the others and depressing the stop button releases all buttons, leaving the record-play switch in play. Some recorders only require that the record button be depressed for record. Depressing fast forward, rewind or play buttons closes the on-off switch and the machine operates in the corresponding button function, mainly by mechanical actuation: rewind and fast forward cause engagement of appropriate drive wheels with the motor drive train and the play button also causes the tape heads to engage and the pinch roller to close on the capatan, driving the tape forward. This invention is of course not limited to the conventional type described.

Message playback is the second principal operation of the answering device. With play button of message deck 10 depressed, deck 10 on-off switch is closed, record-play switch is in play, switch 50 coupled to the record-play switch is in "message play" and SCR 40 and contacts 29 are shunted by switch 50 causing deck to operate in play and also in rewind or fast forward when the appropriate pushbuttons are actuated. During this condition, SCR 40 is off, preventing current flow through announcement deck 1, which otherwise would require additional switching or relays. Thus, the major operations of setting the set in answer or play are performed by actuating the usual buttons of message deck 10.

On returning to the phone and answering set, the user can determine whether a call has been received, most surely by depressing the rewind button for a short tape length and then actuating the play button to listen for a message. A digital tape length indicator, a common accessory in recorders, aids in determining whether a call has been received and other prior art means are available to perform this indicating function.

The answering set may be turned off by depressing the stop button of message deck 10, which turns the set off, another principal operation performed on the controls of deck 10.

To record an announcement, announcement deck 1 is set in record by its controls, (pushbuttons or dial) and a microphone (not shown) is connected by a plug inserted into the input jack (not shown) of deck 1. Message deck 10 is set in play or off, causing switch 50 to be in message play condition. Momentary contact switch 53 is depressed which fires SCR 20 in the same way a ring signal would, and announcement deck 1 starts through its automatic answer cycle. The recorded announcement may be timed by observing a watch or to see sensing strip 4 pass the cassette window, and should slightly overrun switch-on of message deck 10. Sensing tape 5 will turn off both decks 1 and 10 at the conclusion of the message period. By timing or by a mark on the tape, the last 4 or 5 seconds may be used for announcing "end of message time, thank you for calling" or some similar phrase or no concluding phrase need be used.

Deck 1 should be operated in record only for those portions of tape which actually carry sound, the actual announcement or the concluding phrase, while the announcement is being recorded. For the remainder of the tape corresponding to that portion of the announcement-message cycle intended to be blank, deck 1 should be operated in play. This procedure will reduce noise level.

To check the announcement, announcement deck 1 is set in playback with message deck 10 in play or off, switch 50 goes to "message play" and momentary switch 53 is actuated. The announcement deck goes through its cycle; the announcement may be heard through deck 1 speaker and the machine turns off at the end of the cycle. By setting message deck 10 in play or off and switch 50 in "message play," the line seizure circuit is disconnected and undesired line seizure and dial tone are avoided.

The invention herein relates mainly to the automatic answer-message play circuit controlling message deck 10; the ring signal responsive means and line seizure circuit are described to help in understanding the invention, and are dealt with separately in other applications. It is noted that prior art circuits for these functions of programming, line seizure and ring response may be readily used with this invention.

Figure 2:
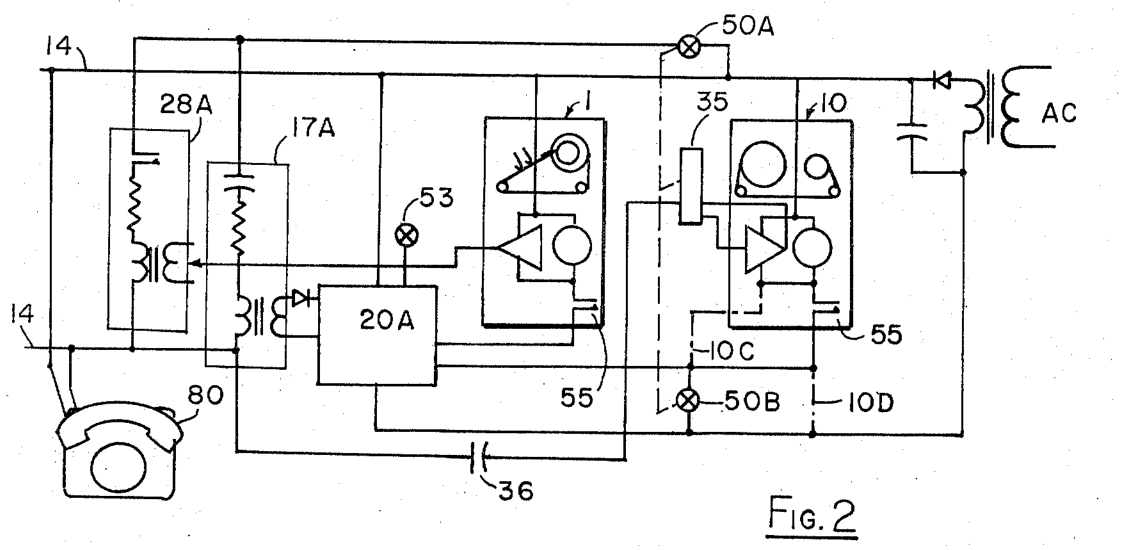
FIG. 2 is a block diagram of the principles of this invention.

FIG. 2 shows the principles of this invention; line seizure means 28A and ring signal responsive means 17A coupled to telephone line 14 have been described (as an example) for FIG. 1 and automatic programming means 20A similarly. Prior art circuits may be used. Switch 50A, when on, enables line seizure circuit 28A and ring signal responsive means 17A, and is coupled to record-play switch 35 which is wired to message deck 10, so that when 50 A is on, record-play switch 35 is in record.

Automatic programming means 20A, exemplified by SCR 20, transistor 26, contacts 29 circuit of FIG. 1, energized announcement deck 1 and message deck 10 during the answering cycle, with current flow through line 10C.

For playback, deck 10 is actuated by internal on-off switch 55 and current flows through line 10D.

Second switching means 50B is coupled to record-play switch 35 shunting automatic programming means 20A with current flow through on-off switch 55; this is a preferred circuit taught in the description for FIG. 1. Other circuits are taught herein.

It is noted that switches 50A, 50B and 35 may be external to deck 10 with separate control although it is preferred to employ the controls of deck 10 and to keep record-play switch 35 within the deck.

The associated telephone set 80 has no major relation to the operation of this circuit and the customer may break in while the machine is in operation.

Figure 3:
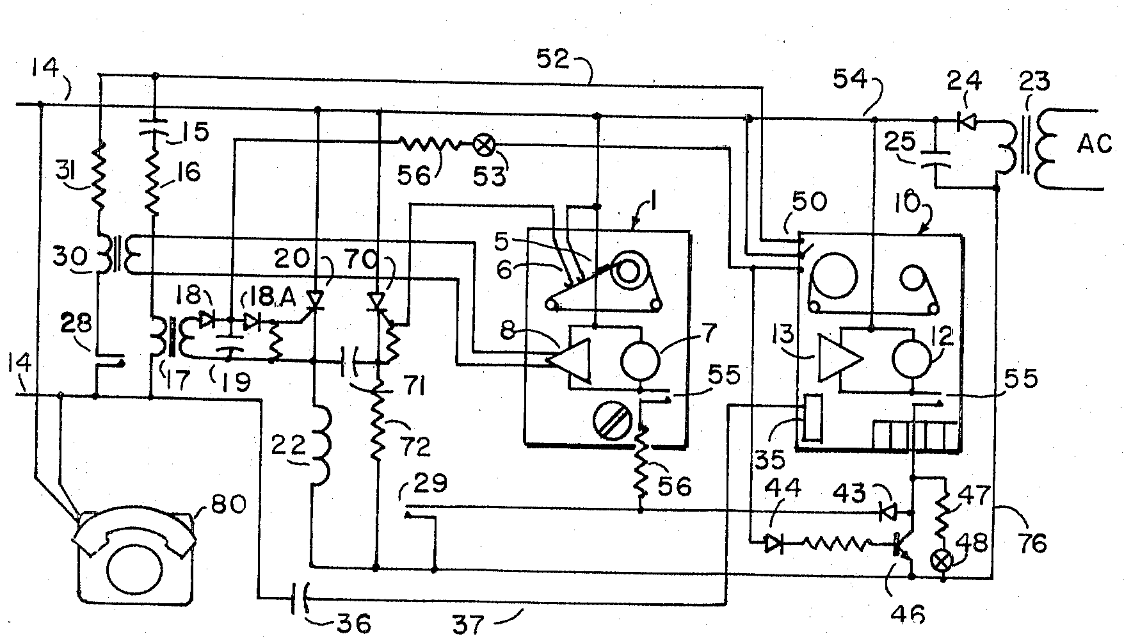
FIG. 3 shows a two recorder circuit for recording both announcement and message with the "automatic answer" "message play" switch within the message tape deck.

The circuit of FIG. 3 is generally similar to the midcycle shift circuit of FIG. 1 except that by recording both announcement and message on each incoming automatically answered call, the circuit is simplified. SCR 20 is commutated differently from the FIG. 1 circuit and switch 50 is simplified to a single pole, double throw switch. With the arm of switch 50 in the upper position, this is "automatic answer" condition; line 54 from power supply normally connected to one side of the telephone line 14 is closed to line seizure circuit 28, 30, 31 and to ring signal responsive means 15, 16, 17. Since this position corresponds with record of record-play switch 35, the machine is ready for a call, and a ring signal causes the set to respond as in FIG. 1 turning on relay coil 22 and closing contacts 28 and 29. Since switches 55 in decks 1 and 10 are closed (for play and record respectively) both units start and remain on throughout the announcement-message cycle with current flow from 54 to deck 1, switch 55 and resistor 56 and from line 54 to deck 10, diode 43 and both to contacts 29 and negative return 76. At the end of the message period, sensing tape 5 crosses sensing tape switch 6 sending an impulse to gate of SCR 70 which turns on momentarily, discharging capacitor 71 across SCR 20 which is thereby turned off. Resistor 72 is selected to provide less than holding current to SCR 70 which causes this circuit to be a dc static switch rather than a flip-flop, and is preferred in this instance. Release of relay 22 opens contacts 28 and 29, decks 1 and 10 are turned off and line seizure is released.

For message playback, the play button of deck 10 is actuated, placing record-play switch 35 in play, turning on switch 55 and arm of switch 50 goes to down or "message play" position; current flows from line 54 through diode 44 to base of transistor 46 turning this transistor on. Current flows through deck 10 and messages are heard through deck 10 speaker. Depressing rewind and fast forward buttons also turns switch 55 on and these operations are performed as well. Announcement deck 1 does not turn on during these operations of deck 10 (play, fast forward, rewind or off) since diode 43 prevents the flow of current from line 54 through deck 1 through transistor 46; this is similar to the action of SCR 40 when turned off, with decks set for playback in FIG. 1. Both FIG. 1 and 3 circuits result in a simplification of switching.

For announcement check, with deck 10 and switch 50 in message play, switch 53 is depressed sending current from 54 through resistor to capacitor 19 and diode 18A to gate of SCR 20 which turns on. The programmer and deck 1 go through their cycle and the announcement may be heard through the announcement deck speaker. This is similar to the circuit in FIG. 1 except that by connecting the actuating circuit in this manner, accidental actuation of switch 53 during automatic answer causing undesired line seizure and dial tone are automatically avoided, without the need to take particular care.

Announcement record is similar to the description for FIG. 1 but the need for timing the announcement is minimized. A concluding phrase is recorded in the same manner as for FIG. 1.

An additional circuit is provided with resistor 47 and switch 48 which enables deck 10 when in "automatic answer" bypassing the automatic programmer. Since the input to amplifier 13 is continuously coupled by line 37 and capacitor 36 to telephone line 14, when message deck 10 is in record and the answering set is in automatic answer (switch 50 is coupled to record-play switch 35), telephone conversations may be recorded in this position. Input of amplifier 13 is coupled by record-play switch 35 to tape head for playback in play condition, permitting recorded conversations to be played back. Advanced circuits are described in FIGS. 4 and 5. By inserting the microphone plug into the input jack of deck 10 with switch 48 on, dictation may be recorded or other recordings made. Microphones in this type of recorder are generally equipped with a "remote" switch which goes in series with switch 55, motor 12 and amplifier 13, enabling the recorder to be turned on and off at the microphone.

Figure 4:
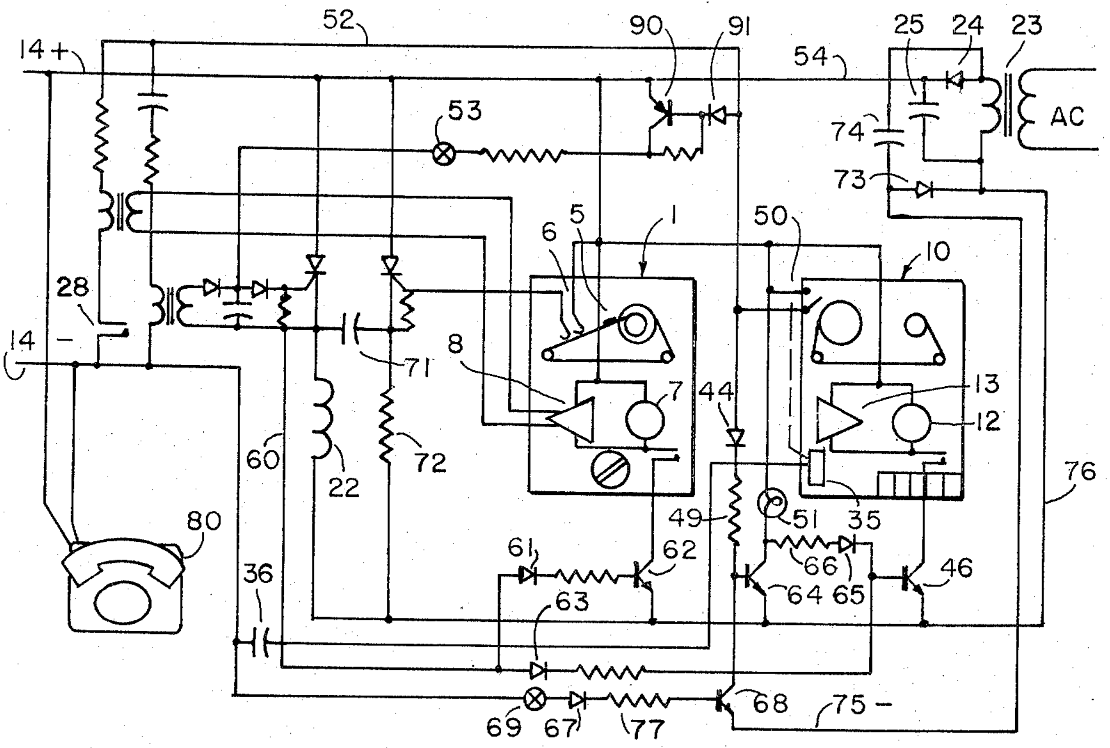
FIG. 4 is a message playback enabling circuit with transistor control of the announcement and message recorders, a single contact line seizure relay and an automatic telephone conversation recorder.

In FIG. 4, the line seizure circuit and ring signal responsive means are the same as in FIG. 2 except that relay 22 has only a single contact 28 which is a considerable simplification. An announcement-message record circuit is shown; however, mid-cycle shift circuits and other prior art programmers may be used. In this invention, it is taught to use some or all of the controls of a message deck 10 of usual design to control automatic answer and message playback functions of the answering set.

Switch 50 is a single pole, single throw switch, contacts for which may be found or be made readily available in the record-play switch of tape decks currently marketed and it is extremely simple, if necessary, to add such a switch to the record-play switch if such changes are not desired. The use of this simple switch with solid state components increases overall reliability. The closed position, arm up, of switch 50 corresponds with the record position of record-play switch 35, and the machine is in "automatic answer." In this position, a ring signal in line 14 latches SCR 20, relay coil 22 is energized and contacts 28 close, establishing line seizure. Line 60 at the top of relay coil 22 becomes energized to near power supply voltage and sends current through diode 61 to the base of transistor 62 which turns on and turns on deck 1 (in play). The same power through line 60 goes to diode 63 and base of transistor 46 which turns on and deck 10 goes on (in record).

At the end of the cycle, sensing tape 5 crosses sensing tape switch 6 giving an impulse to the gate of SCR 70 which turns on momentarily, discharging capacitor 71 across SCR 20 which then turns off, causing relay 22 and contacts 28 to drop out. Voltage across coil 22 goes to zero, transistors 62 and 46 turn off and decks 1 and 10 stop. The set is in standby automatic answer.

For message playback, message play button of deck 10 is actuated, switch 50 opens and record play switch 35 goes to play. Voltage previously sent to base of transistor 64 from switch 50 through diode 44 and resistor 49 is removed and transistor 64, which functions as a buffer inverter, turns off. Lamp 51 goes out but current now flows through diode 65 to base of transistor 46 which turns on, enabling message deck 10 to operate: in play, rewind, fast forward or to be turned off.

In automatic answer, buffer inverter transistor 64 is on since voltage is sent to its base by switch 50, 44 and 49, and lamp 51 lights. The forward voltage drop across collector and emitter of 64 is small and is further reduced by resistor 66 and diode 65 so that no current is sent into base of transistor 46. Operation of the programmer, with 64 in this condition, results in substantial current sent to 46 base for operation in automatic answer.

Announcement record and check are similar to FIG. 3 and also FIG. 1. Transistor 90 is normally on; when switch 50 is on, with set in automatic answer, current flows through diode 91 into base of transistor 90 so that it is turned nearly off and relatively little current will flow through switch 53 to gate of SCR 20 when actuated. With the set in play or deck 10 off, transistor 90 is turned on again and switch 53 functions to start the announcement record or check cycles. This is another circuit to avoid accidental line seizure and dial tone, automatically, transistor 90 funtioning as an inverter.

When M deck 10 is operated in message play, switch 50 off, switch 35 in play, current into base of transistor 46 which is on, no current goes to base of transistor 62 from base of transistor 46 since flow is blocked by diode 63, and the announcement deck 1 does not operate in this setting.

An automatic circuit is provided for telephone conversation recording which is actuated by the voltage difference between telephone line 14 at rest and during line seizure compared with normal power supply voltage, Resting voltage of the telephone line is 40 to 50 volts, as supplied by the central office. During line seizure by the associated telephone set 80, current flows through the telephone set and voltage at line 14 termination at 80 drops to about 6 volts although this may vary from 4 to 12 volts depending on the resistance of the telephone set transmitter. Voltage also drops during dialing and ringing.

By providing a line with a voltage intermediate between these two levels, transistor 68 is actuated to turn message deck 10 on and off to conform with the telephone instrument being on or off the hook. Since the input of amplifier 13 is coupled to line 14 through capacitor 36 and record-play switch 35 (in record) during automatic answer, actuation of deck 10 causes telephone conversations to be recorded. On hanging up, deck 10 is turned off automatically.

Usual cassette decks require 6 to 7.5 volts (four or five cells) for operation; in the 7.5 volt units, 6.5 to 10 volts is acceptable. Here power supply voltage across 54 and 76 is about 8 volts. In the circuit of FIG. 4 substantial variation in talking voltage will enable operation without difficulty since line 75 is 20 volts negative with respect to 54. This voltage is obtained by voltage doubler circuit, diode 73 and capacitor 74 together with regular supply diode 24 and capacitor 25 across secondary of transformer 23. Other means may be used to obtain this intermediate voltage such as center tapped transformer, etc.

When voltage in 14− is −45 volts with respect to line 54, 14+, line 75 is −20 volts with respect to line 54,14+ and therefore 25 volts more positive than 14−; in this condition (with on-off switch 69 closed) diode 67 is reverse biased and presents an extremely high resistance to line 14, 14− and current flow is in the order of nanoamperes which does not in the least interfere with telephone service. When line seizure occurs by lifting the telephone 54, 14+voltage across line 14,14− drops to 6 to 12 volts and line 14− is accordingly 14 to 8 volts positive with respect to line 75; a small current then flows through diode 67 and resistor 77 into base of transistor 68 which turns on. Current flow from collector to emitter of transistor 68 drops the voltage at the base of transistor 64 and voltage across collector and emitter of 64 rises sharply causing current flow into the base of transistor 46 which turns on. Since deck 10 is in automatic answer-record, deck 10 starts and records the telephone conversation since the input of amplifier 13 is coupled to line 14,14−. The reverse process occurs when the phone is hung up and deck 10 stops. As with message play, the conversation may be played back by depressing first the rewind button and then the play button without further switching. The principal advantage of this circuit is that the user of the set need not remember to turn the deck 10 on and off, especially at the conclusion of the conversation, since this function performed automatically.

If provision for dictation or other recording is desired, the switching system of FIG. 3 using resistor 47 and switch 48 may be used, across 46.

Figure 5:
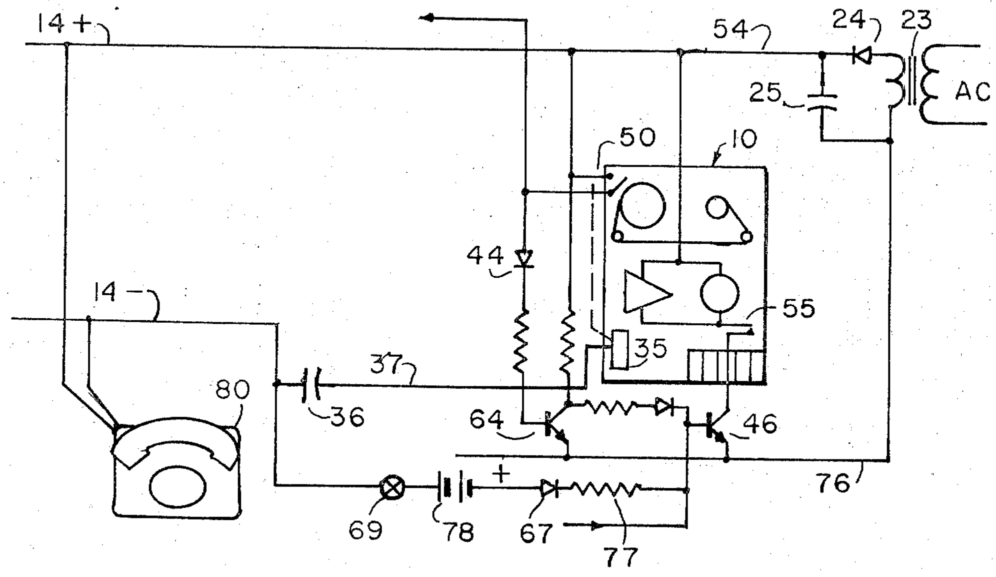
FIG. 5 is an alternate automatic telephone conversation recording circuit.

In FIG. 5 is shown a simpler system employing the principle of an intermediate supply voltage although it has the disadvantage of requiring bias batteries which must be replaced at the end of their shelf life. Normally the 6 volts which occurs on line seizure in line 14 is sufficient to bias the base of transistor 46 directly to start the deck for conversation recording since supply voltage is 8 volts, providing a 2 volt operating differential. However, in some cases, telephone sets with high resistance result in a 12 volt line seizure condition or sometimes 10 volts. In the last case, the differential is $-10-(-8)=-2$, insufficient for operation of 46. Batteries 78 of about 3 volts increase the differential between lines 14− and 75 to $-10+3-(-8)=+1$ which is adequate to forward bias transistor 46. A dictation circuit may be added using resistor 47 and switch 48 as in FIG. 3. The programmer circuit is omitted for clarity; the circuit is of course applicable to message recorders only.

The circuits of FIGs. 4 and 5 require that the terminals of the set 14, 14− be properly polarized with respect to the polarity of the telephone line. Improper connection will be immediately seen by message deck 10 operating when in automatic answer with switch 68 "on" and no damage will be done provided the error is corrected at this point.

Figure 6:
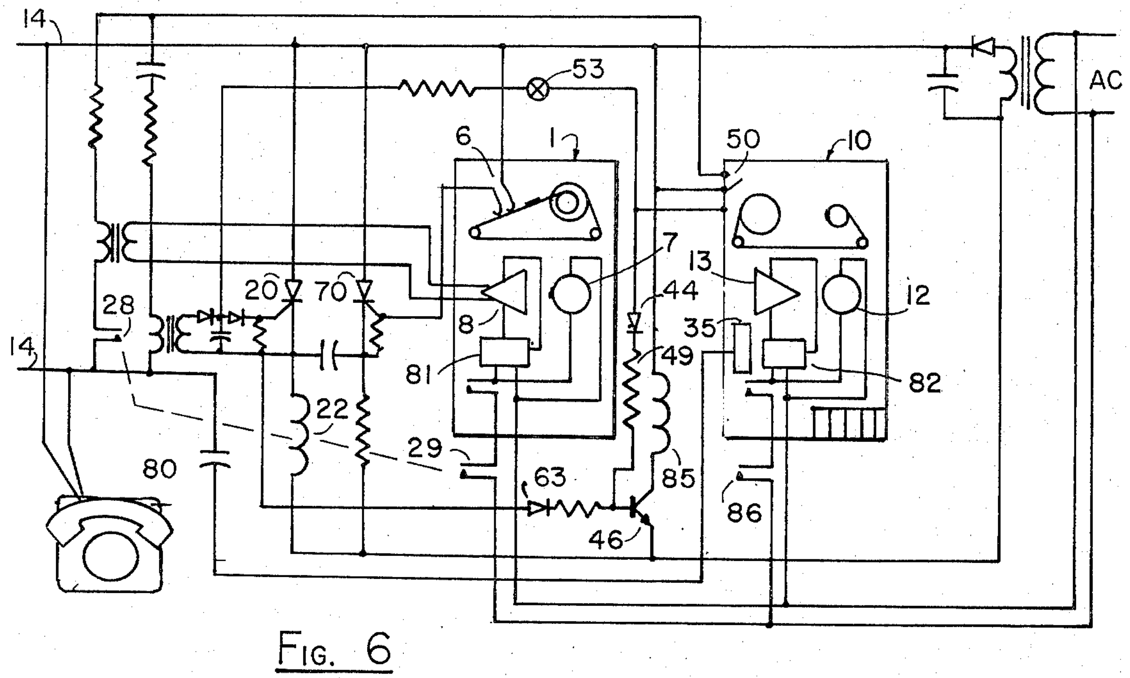
FIG. 6 is a circuit employing ac operated announcement and message recorders.

FIG. 6 shows the priciple of employing conventional controls in the message deck 10 applied to ac operated recorders. Motors 7 and 12 and power supplies 81 and 82 are ac operated; amplifiers 8 and 13 are solid state (preferred). The principal difference is that relay 85 with contacts 86 is used to control message deck 10. Switch 50 in record-automatic answer enables line seizure-ring signal responsive means as in FIG. 2. A ring signal causes SCR 20 to latch, operating relay 22 and closing contacts 28 and 29. Transistor 46 energized from the high side of coil 22 pulls in relay coil 85 and contacts 86; decks 1 and 10 turn on by closed contacts 29 and 86 and operate in play and record respectively. These decks remain on during the announcement-message cycle and turn off when SCR 70 is actuated by sensing tape switch 6. Switch 50 in message play, with switch 35 in play, energizes transistor 46, turning on relay 85,86 enabling deck 10 to be operated in play and related operations. Reverse flow through relay 22 is blocked by diode 44 and deck 1 does not operate, except for announcement record and check when switch 53 is actuated.

Figure 7:
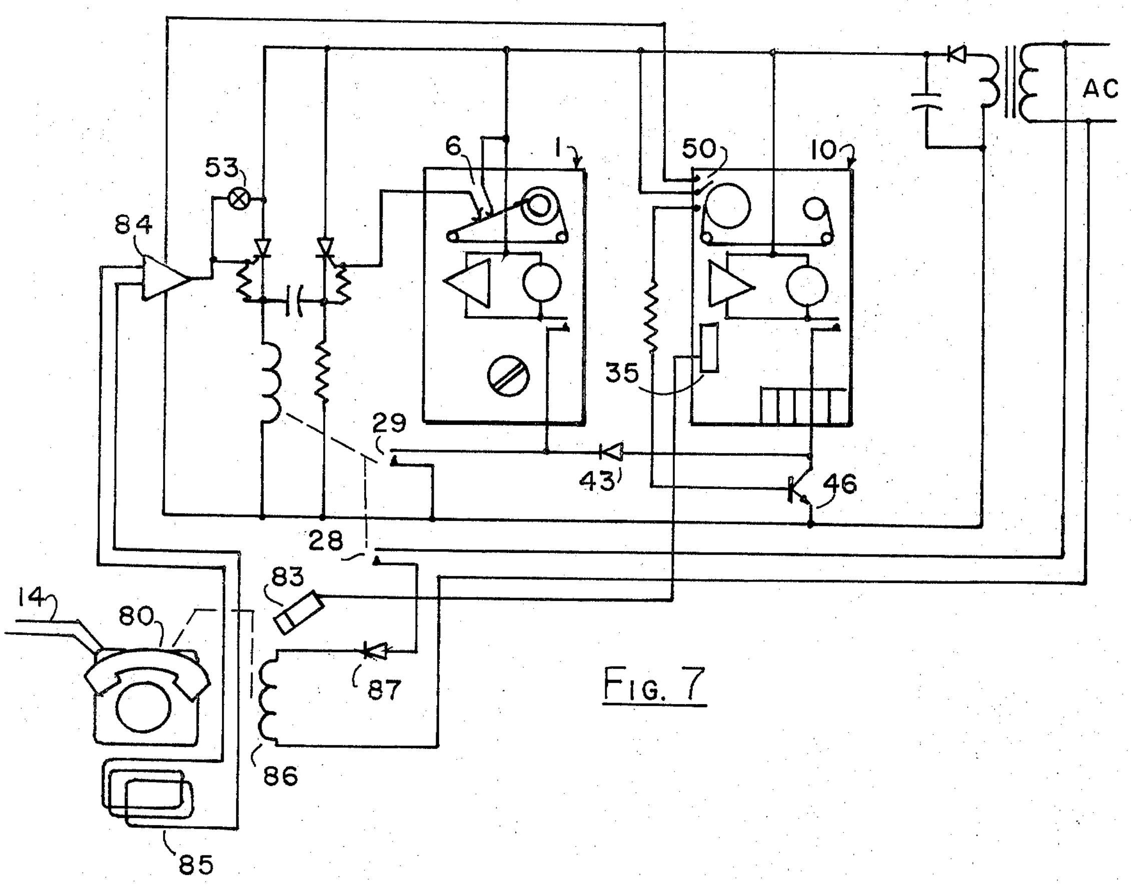
FIG. 7 is a handset lifter circuit with recorders acoustically coupled.

In FIG. 7, a handset lifter type of answering set is acoustically coupled to decks 1 and 10 by the speaker of deck 1 being located near the transmitter of the lifted handset of 80 and the microphone 83 of deck 10 located near the receiver of the handset. Switch 50 in automatic answer (coupled as before to record-play switch 35 of deck 10) and induction coil 85 coupled to input of ring amplifier 84 responds to a ring signal in telephone set 85 giving an impulse to SCR 20 which latches on; relay 22 and contacts 28 and 29 pull in and current flows through diode 87 to handset lifter solenoid from ac line establishing line seizure by lifting the handset. The decks play the announcement and record the message. SCR 70 actuated by sensing tape switch 6 commutates SCR 20, the handset lifter solenoid is deenergized, the handset is replaced and line seizure is released. The remainder of the operations, message play, fast forward, rewind, off, announcement record and check are the same as previously described.

It is practical to employ auto stereo endless loop recorders for the message deck using the controls in the same manner as described for the cassette recorder; however, a fast forward switching circuit and sensing tape switch must be provided to return the tape to start for message play. A cassette recorder with endless tape loop cassette with sensing tape and switch may be employed similarly, noting that the rewind and fast forward of these decks do not operate normally with endless loops.

In tape decks, the record-play switch normally functions to switch the record-play head to the input of the amplifier and to switch the output of the amplifier to the speaker in play position; in record, the microphone or input jack is switched to the input of the amplifier and the output of the amplifier is connected to the record-play head, at the same time disconnecting the speaker and connecting bias to the erase head. In addition other functions such as altering the amplifier frequency response and connecting the level meter in record, may be switched.

The amplifier of the deck, record-play switch, microphone and connections therefor, speaker and like accessories may be external to the tape deck although major advantages are taught in the use of "off-the-shelf" mass-produced home entertainment types which may be seen in electronics supply catalogs, such as Lafayette Radio Electronics Catalog 700, 1970 issue, pp. 83–104. These units or similar ones may be applied to this invention with little alteration at sharply lower cost comprising a major advantage over recorders made especially for telephone recording service which are substantially more costly.

Two tape recorders as shown herein may be housed together with power supply, automatic programmer and additional switching in one case, with accessible controls. The cassettes may be open to view and unnecessary controls on the announcement deck may be put to other uses (such as fast forward and rewind). A dial control on the announcement deck is well adapted to be used for additional services.

In the claims, the term "tape deck" means a tape deck, open reel or reel to reel cartridge, endless loop auto stereo cartridge, compact cassette recorder, tape player, playtape or the like, record-play and erase heads, mechanical linkage for engaging the tape and heads, motor transport, and controls which may include play, rewind, fast forward and record, the latter usually with a record-play switch, and an amplifier may be included, with speaker, microphone and jacks for connections. An on-off switch is usually associated with the controls.

A monitor circuit may be included by placing a switch across that portion of the record-play switch which diconnects the speaker during record and by altering the load resistor for the amplifier output in record to approximate conditions with the speaker either connected or disconnected, usually by substituting a slightly higher value for the resistor normally in the circuit. Reference may be had to Disclosure Document No. 4,925, filed Apr. 20, 1971, discussing this circuit.

I claim:

1. A telephone answering set coupled to a telephone line for reproducing an announcement and recording messages comprising announcement tape reproducing means, a message tape deck, a record-play switch associated with said message tape deck, said record-play switch having "record" and "play" positions, ring signal responsive means, a line seizure circuit and automatic programming means, said telephone answering set having an "automatic answer" condition and a "message play" condition in which said message tape deck is enabled to play back messages, said telephone answering set in said "automatic answer" condition responding to a ring signal received in said telephone line, said ring signal actuating said ring signal responsive means, said ring signal responsive means then actuating said line seizure circuit to establish line seizure and in addition actuating said automatic programming means into an ordered sequence of starting and stopping said announcement tape reproducing means and starting and stopping said message tape deck and subsequently deactuating said line seizure circuit and releasing line seizure and first switching means having "on" and "off" positions, said first switching means coupled to said record-play switch, said " on" position corresponding with said "record" position and said "automatic answer" condition, said "off" position corresponding with said "play" position and said "message play" condition, said first switching means in said "on" position rendering operational at least one of said line seizure circuit and said ring signal responsive means.

2. In claim 1, a record control within said message tape deck coupled to said record-play switch, said first switching means coupled to said record control.

3. In claim 1, conventional controls within said message tape deck for rewind, fast forward and play.

4. In claim 1, said message tape deck comprising a conventional tape deck.

5. In claim 1, said message tape deck comprising a conventional cassette recorder.

6. In claim 1, a power source, an associated telephone set, said telephone line having positive and negative terminals, a transistor, said transistor having a base, a diode, said diode having an anode and a cathode, said telephone line having positive and negative terminals, and a voltage in said telephone line, said voltage being high when said telephone set is not operated, operation of said telephone set causing line seizure and a drop of said voltage to talking voltage, said power source producing a voltage intermediate between said resting voltage and said talking voltage, said transistor in series with said message tape deck across said power source, said anode of said diode connected to said negative terminal of said telephone line, said cathode of said diode oriented to said base, said talking voltage forward biasing said diode and said base, enabling said message tape deck for telephone conversation recording, said resting voltage reverse biasing said diode and turning off said message tape deck when said telephone set is not operated.

7. In claim 6, a battery, said battery in series with said diode and said base, increasing operating differential of said talking voltage with respect to said power source voltage.

8. A telephone answering set coupled to a telephone line for reproducing an announcement and recording messages comprising announcement tape reproducing means, a message tape deck, a record-play switch associated with said message tape deck, said record-play switch having "record" and "play" positions, ring signal responsive means, a line seizure circuit and automatic programming means, said telephone answering set having an "automatic answer" condition and a "message play" condition in which said message tape deck is enabled to play back messages, said telephone answering set in said "automatic answer" condition responding to a ring signal received in said telephone line, said ring signal actuating said ring signal responsive means, said ring signal responsive means then actuating said line seizure circuit to establish line seizure and in addition actuating said automatic programming means into an ordered sequence of starting and stopping said announcement tape reproducing means and starting and stopping said message tape deck and subsequently deactuating said line seizure circuit and releasing line seizure, first switching means having "on" and "off" positions and second switching means having "on" and "off" positions, said first and second switching means coupled to said record-play switch, said "on" position of said first switching means corresponding with said "off" position of said second switching means, with said "record" position and with said "automatic answer" condition, said "off" position of said first switching means corresponding with said "on" position of said second switching means, with said "play" position and with said "message play" condition, said first switching means in said "on" position rendering operational at least one of said line seizure circuit and said ring signal responsive means, said second switching means in said "on" position enabling said message tape deck for "message play."

9. In claim 8, a power source, said second switching means including a transistor, a base for said transistor, a switch, "on" and "off" positions for said switch corresponding with said "on" and "off" positions of said second switching means and a diode, said transistor in series with said message tape deck across said power source, said switch in said "on" position sending current from said power source to said base of said transistor, turning said transistor on and energizing said message tape deck for "message play", said diode in series with said automatic programming means and said base of said transistor, said automatic programming means sending current from said power source through said diode to said base of said transistor, turning said transistor on, energizing said message tape deck for "automatic answer" and subsequently turning said transistor off, and deactuating said message tape deck during said ordered sequence of automatic answer, said diode preventing current flow backward from said power source through said second switching means to energize said automatic programming means.

10. In claim 8, a record control within said message tape deck coupled to said record-play switch, said first and second switching means coupled to said record control.

11. In claim 8, conventional controls within said message tape deck for rewind, fast forward and play.

12. In claim 8, said message tape deck comprising a conventional tape deck.

13. In claim 8, said message tape deck comprising a conventional cassette recorder.

14. In claim 8, an ac line, a power source, said second switching means including a switch having "on" and "off" positions corresponding with said "on" and "off" positions of said second switching means, a transistor, and a relay, said relay having a coil and contacts, said transistor in series with said coil of said relay across said power source, said switch in said "on" position sending current to said transistor, turning said transistor on, said transistor then turning said relay on, said contacts in series with said message tape deck across said ac line enabling said message tape deck to operate in "message play", said automatic programming means turning said transistor on and off in ordered sequence of automatic answering, energizing and deenergizing said relay and turning said message tape deck on and off, when said switch is in said "off" position.

15. In claim 8, said message tape deck having an input, said input continuously coupled by a capacitor to said telephone line.

16. In claim 8, said message tape deck having an input, said input coupled by a capacitor to said line seizure circuit.

17. In claim 8, a start switch to start said automatic programming means, simulating the receipt of a ring signal, said switch connecting said second switching means to said automatic programming means, said switch being enabled when said second switching means is in said "on" position, corresponding with "message play" condition, preventing accidental actuation of said automatic programming means when said telephone answering set is in "automatic answer."

18. In claim 8, a power source and manually actuated third switching means having "on" and "off" positions, in series with said message tape deck, across said power source, said third switching means substantially in parallel with said second switching means and in said "on" position enabling operation of said message tape deck for telephone recording and dictation.

19. In claim 8, a power source, said first and second switching means including a single pole, single throw switch, said switch having "on" and "off" positions corresponding with said "on" and "off" positions of said first (and second) switching means and with said "off" and "on" positions of said second switching means, a buffer inverter transistor, a second transistor, said second transistor in series with said message tape deck across said power source, said buffer inverter transistor when "on" turning said second transistor "off", said buffer inverter transistor when "off" turning said second transistor "on", said switch in said "on" position turning "on" said buffer inverter transistor, said buffer inverter transistor turning "off" said second transistor, said automatic programming means turning said second transistor "on" and "off" during said ordered sequence of automatic answering thereby energizing and subsequently deactuating said message tape deck, said switch in said "off" position, turning "off"

said buffer inverter transistor, said second transistor being turned "on" by said buffer inverter transistor to enable said message tape deck for "message play."

20. In claim 19, a start switch to start said automatic programming means, simulating the receipt of a ring signal, a transistor, a base for said transistor, said transistor held normally "on" from said power source, said base connected to said single pole, single throw switch, said start switch connecting said transistor and said automatic programming means, said (switching means) single pole, single throw switch in said "on" position turning said transistor to "off", disabling said start switch, said (switching means) single pole, single throw switch in said "off" position restoring said transistor to "on" condition and enabling said start switch, preventing actuation of said start switch in "automatic answer."

21. In claim 8, a power source and a rectifying element, said rectifying element in series with said message tape deck and said automatic programming means across said power source, said automatic programming means in automatic answer, furnishing power from said power source to said announcement tape reproducing means and to said message tape deck through said rectifying element, said second switching means furnishing power from said power source ahead of said rectifying element to said message tape deck for "message play", said rectifying element preventing current flow from said power source to said announcement tape reproducing means during "message play."

22. In claim 21, said rectifying element comprising a thyristor triggered into a latched condition and released into an unlatched condition by said automatic programming means.

23. In claim 21, said rectifying element comprising a diode.

24. In claim 21, said second switching means including a transistor, said transistor having a base, and a switch, said switch having "on" and "off" positions corresponding with said "on" and "off" positions of said second switching means, said transistor in series with said message tape deck across said power source, said switch in said "on" position sending current from said power source to said base of said transistor, turning said transistor on and enabling said message tape deck for "message play."

* * * * *